(12) United States Patent
Gonze et al.

(10) Patent No.: US 8,720,192 B2
(45) Date of Patent: May 13, 2014

(54) ENGINE OFF PARTICULATE FILTER ("PF") REGENERATION USING A PLURALITY OF SECONDARY ENERGY STORAGE DEVICES (75) Inventors: Eugene V. Gonze, Pinckney, MI (US); Michael J. Paratore, Jr., Howell, MI (US); Michael G. Reynolds, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 13/462,871

(22) Filed: May 3, 2012

(65) Prior Publication Data

US 2013/0291515 A1 Nov. 7, 2013

(51) Int. Cl.
*F01N 3/027* (2006.01)

(52) U.S. Cl.
USPC .................. 60/295; 60/274; 60/286; 60/289; 60/291; 60/297; 60/303; 60/311; 60/320

(58) Field of Classification Search
USPC .......... 60/274, 286, 287, 289, 291, 295, 297, 60/303, 311, 320
See application file for complete search history.

(56) References Cited

U.S. PATENT DOCUMENTS

| | | | | |
|---|---|---|---|---|
| 5,388,400 | A | * | 2/1995 | Hoppenstedt et al. ........... 60/274 |
| 5,397,550 | A | * | 3/1995 | Marino, Jr. .................... 422/178 |
| 2004/0226287 | A1 | * | 11/2004 | Edgar et al. ..................... 60/295 |
| 2006/0021332 | A1 | * | 2/2006 | Gaiser ............................. 60/286 |
| 2008/0164081 | A1 | * | 7/2008 | Watanabe et al. ............ 180/65.2 |
| 2008/0282674 | A1 | * | 11/2008 | Gonze et al. .................... 60/285 |
| 2010/0326403 | A1 | * | 12/2010 | Gonze et al. .................. 123/436 |
| 2011/0277449 | A1 | * | 11/2011 | Gonze et al. .................... 60/274 |
| 2012/0031079 | A1 | * | 2/2012 | Spicer et al. .................... 60/278 |

* cited by examiner

*Primary Examiner* — Thomas Denion
*Assistant Examiner* — Jorge Leon, Jr.
(74) *Attorney, Agent, or Firm* — Cantor Colburn LLP (57) ABSTRACT

An exhaust gas treatment system for an internal combustion engine is provided. The internal combustion engine has an engine off condition. The exhaust gas treatment system includes particulate filter ("PF") device in fluid communication with an exhaust gas conduit, an electric heater, a primary energy storage device, a plurality of secondary energy storage devices, and a control module. The PF device has a filter structure for removal of particulates in the exhaust gas, and is selectively regenerated based on an amount of particulates trapped within the filter structure of the PF device. The electric heater is disposed upstream of the filter structure and is selectively energized to provide heat for regeneration of the PF device. The plurality of secondary energy storage devices are selectively connected to the primary energy storage device. The secondary energy storage devices selectively energize the electric heater.

17 Claims, 3 Drawing Sheets

ENGINE OFF PARTICULATE FILTER ("PF") REGENERATION USING A PLURALITY OF SECONDARY ENERGY STORAGE DEVICES

FIELD OF THE INVENTION

Exemplary embodiments of the invention relate to exhaust gas treatment systems for internal combustion engines and, more particularly, to an exhaust gas treatment system that includes a plurality of secondary energy storage devices that are selectively connected to a primary energy storage device.

BACKGROUND

The exhaust gas emitted from an internal combustion engine is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). An exhaust treatment technology in use for high levels of particulate matter reduction may include a particulate filter ("PF") that traps particulate matter. Regeneration is the process of removing the accumulated particulate matter from the PF device.

During regeneration, a front surface of the PF device is heated to a specified temperature that allows for the trapped particulate matter to oxidize, thereby creating a flame front that generally burns longitudinally along the PF device. In one approach, the exhaust gas temperature may be raised through operation of the engine during regeneration. Specifically, the exhaust gas temperature is elevated to a level sufficient to reduce the probability that the flame front may be extinguished by relatively high airflow created by accelerating the engine. However, raising the exhaust gas temperature generally requires increased amounts of fuel, which in turn will decrease fuel economy. Moreover, exhaust emissions are increased during the regeneration process.

Active regeneration refers to the process of oxidizing the accumulated diesel particulate matter in the PF device without relying on the temperature of the exhaust gas emitted by the engine, which in turn improves fuel economy. This approach may involve heating the PF device by an electrical heater until the PF device reaches the point at which the particular matter trapped in the PF device oxidizes. The electrical heater is energized if the engine is turned off, and generally receives electrical power from a vehicle battery. However, the use of an electrical heater while the engine is turned off will, over time, diminish the vehicle battery. Accordingly, it is desirable to provide an exhaust gas treatment system that provides heat needed for regeneration when the engine is turned off, while at the same time reducing or substantially eliminating battery drainage.

SUMMARY OF THE INVENTION

In one exemplary embodiment of the invention, an exhaust gas treatment system for an internal combustion engine is provided. The internal combustion engine has an engine off condition. The exhaust gas treatment system includes a particulate filter ("PF") device in fluid communication with an exhaust gas conduit, an electric heater, a primary energy storage device, a plurality of secondary energy storage devices, and a control module. The PF device has a filter structure for removal of particulates in the exhaust gas. The PF device is selectively regenerated based on an amount of particulates trapped within the filter structure. The electric heater is disposed upstream of the filter structure and is selectively energized to provide heat for regeneration of the PF device. The plurality of secondary energy storage devices are selectively connected to the primary energy storage device. The secondary energy storage devices selectively energize the electric heater. The control module is in communication with the electric heater, the primary storage device, the plurality of secondary energy storage devices, and the internal combustion engine. The control module receives a regeneration signal indicating the amount of particulates trapped within the filter structure of the PF device. The control module includes control logic for disconnecting the plurality of secondary energy storage devices from the primary storage device if the internal combustion engine is in the engine off condition. The control module includes control logic for connecting the plurality of secondary energy storage devices to the electric heater if the regeneration signal is received.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
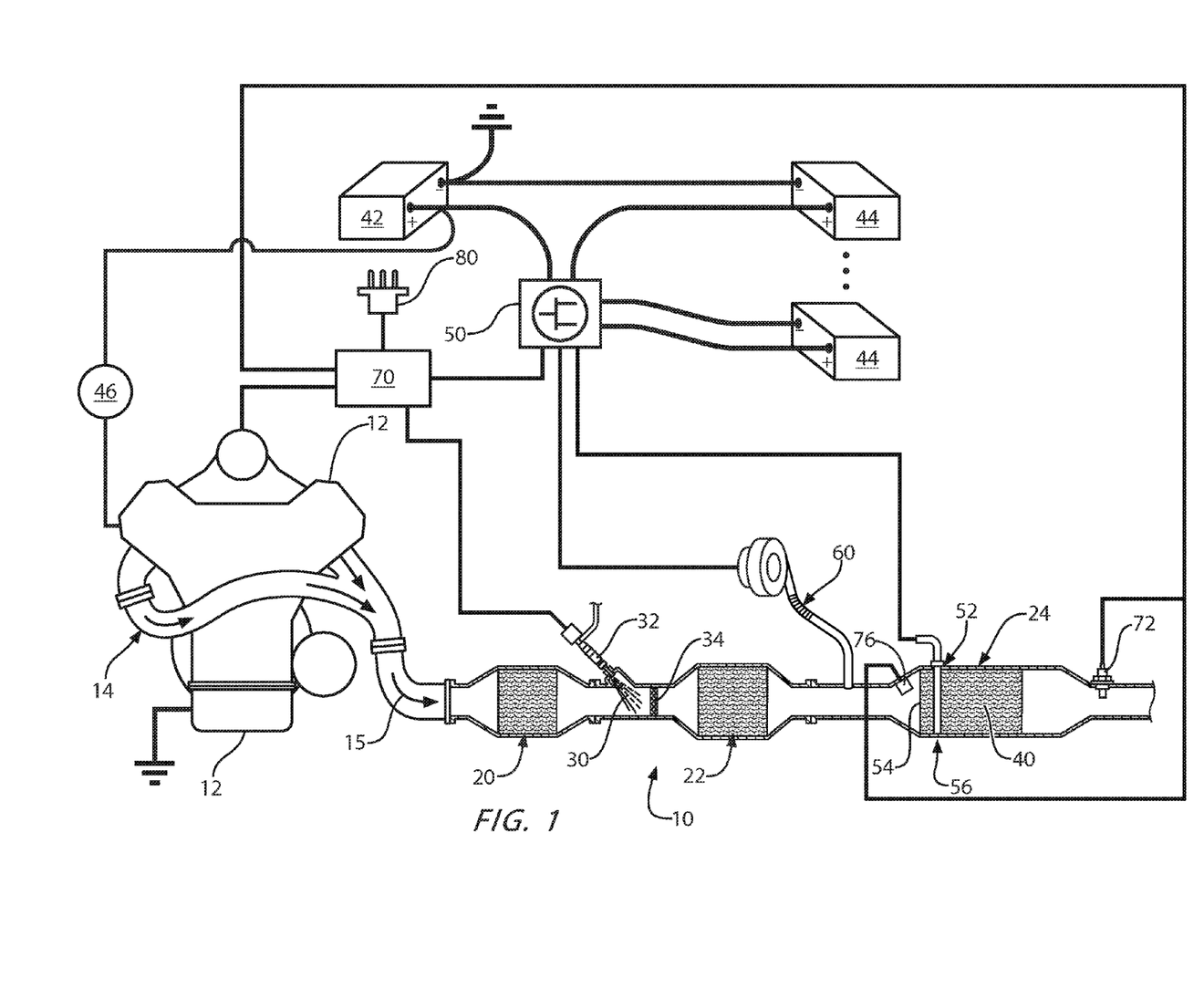
FIG. 1 is a schematic diagram of an exemplary exhaust gas treatment system.

Referring now to FIG. 1, an exemplary embodiment is directed to an exhaust gas treatment system 10, for the reduction of regulated exhaust gas constituents of an internal combustion ("IC") engine 12. The exhaust gas treatment system described herein can be implemented in various engine systems that may include, but are not limited to, diesel engine systems, gasoline engine systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include an oxidation catalyst device ("OC") 20, a selective catalytic reduction device ("SCR") 22, and a particulate filter ("PF") device 24. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The OC device 20 includes, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 20 is useful in treating unburned gaseous and non-volatile HC and CO, which are oxidized to form carbon dioxide and water.

The SCR device 22 may be disposed downstream of the OC device 20. In a manner similar to the OC device 20, the SCR device 22 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia ("$NH_3$").

A reductant 30 may be supplied from a reductant supply source (not shown) and may be injected into the exhaust gas conduit 14 at a location upstream of the SCR device 22 using an injector 32, or other suitable method of delivery of the reductant 30 to the exhaust gas 15. In one embodiment, the reductant 30 reductant may be an aqueous urea solution that decomposes to ammonia ("$NH_3$") in the hot exhaust gases and is absorbed by the SCR device 22. The ammonia then reduces the $NO_x$ to nitrogen in the presence of the SCR catalyst. A mixer or turbulator 34 may also be disposed within the exhaust conduit 14 in close proximity to the injector 32 to further assist in thorough mixing of the reductant 30 with the exhaust gas 15.

The PF device 24 may be disposed downstream of the OC device 20 and the SCR device 22. The PF device 24 operates to filter the exhaust gas 15 of carbon and other particulates. In various embodiments, the PF device 24 may be constructed using a ceramic wall flow monolith filter 40 that is wrapped in an insulation mat or other suitable support that expands when heated, securing and insulating the filter 40. The filter 40 may be packaged in a shell or canister that is, for example, stainless steel, and that has an inlet and an outlet in fluid communication with exhaust gas conduit 14.

The ceramic wall flow monolith filter 40 may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 15 entering the filter 40 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic wall flow monolith filter is merely exemplary in nature and that the PF device 24 may include other filter devices such as wound or packed fiber filters, open cell foams, sintered metal fibers, etc. The increase in exhaust backpressure caused by the accumulation of particulate matter in the monolith filter 40 typically requires that the PF device 24 is periodically cleaned, or regenerated. Regeneration involves the oxidation or burning of the accumulated carbon and other particulates in what is typically a high temperature environment (>600° C.).

The exhaust gas treatment system 10 also includes various energy storage devices. In the embodiment as illustrated, a primary energy storage device 42 and a plurality of secondary energy storage devices 44 are provided. The primary energy storage device 42 is a vehicle battery such as, for example, a 12 volt lead acid type battery. Although a lead acid battery is discussed, it is to be understood that other types of energy storage devices may be used as well. The secondary energy storage devices 44 are generally any type of rechargeable energy storage device such as, for example, a lithium-ion batteries or ultracapacitors. In one exemplary embodiment, six secondary energy storage devices 44 may be provided, however it is understood that any more than one energy storage devices 44 may be used as well.

Figure 2:
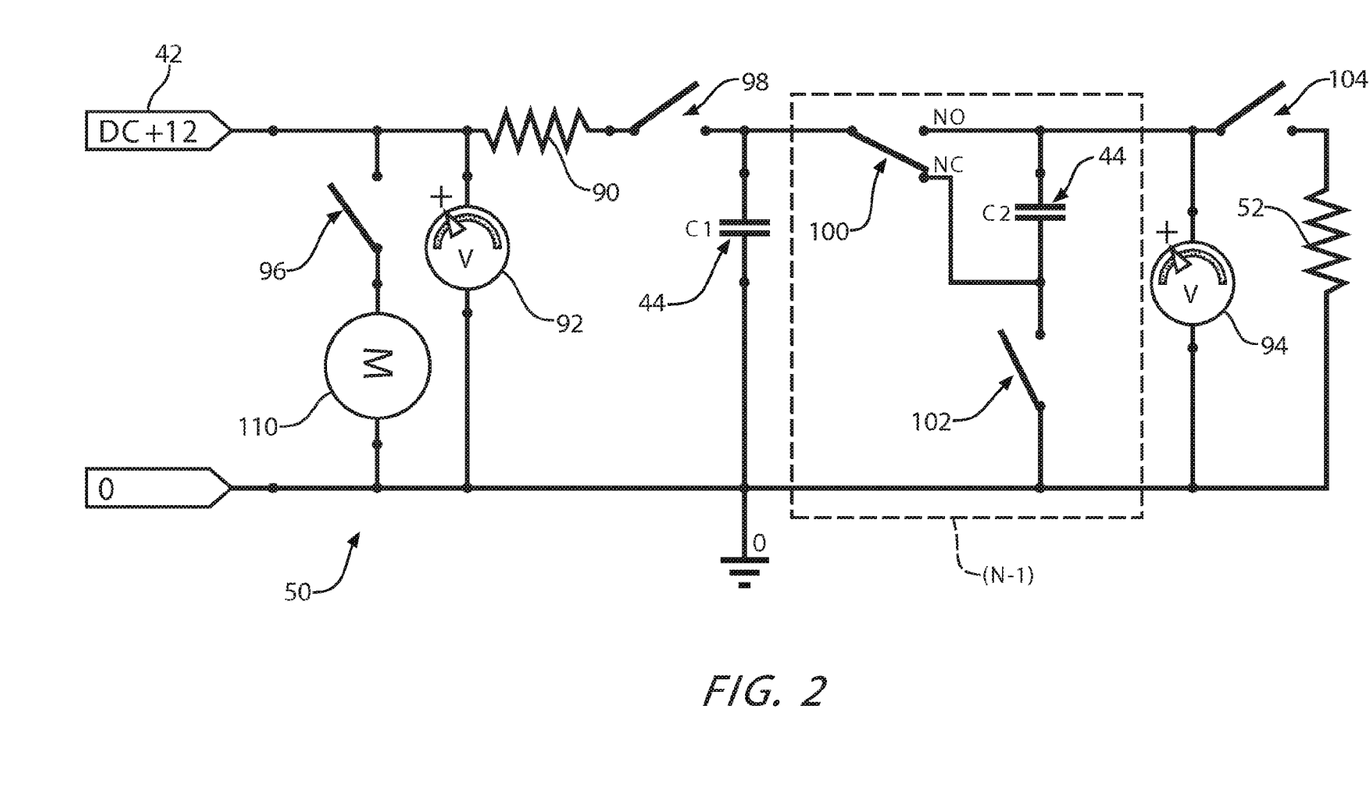
FIG. 2 is a schematic diagram of the circuit illustrated in FIG. 1.

The primary energy storage device 42 is electrically connected to a vehicle generator 46. The generator 46 is part of the engine 12. The generator 46 converts mechanical power and energy received from the engine 12 into electrical power and energy needed for vehicle electrical loads of various electrical components and systems of a vehicle (not shown). The generator 46 may convert additional mechanical power and energy into electrical power and energy beyond what is needed for the vehicle electrical loads (not shown). This additional electrical power and energy is referred to as the excess power or energy. In this case, an electrical system voltage is generally raised, and the excess power or energy from the generator 46 is stored in the primary energy storage device 42, in the secondary energy storage devices 44, or in both the primary and secondary energy storage devices 42 and 44. Likewise, if the generator 46 does not convert the mechanical power and energy into electrical power and energy required for vehicle electrical loads (not shown), then the electrical system voltage is generally lowered. Power or energy may be removed from the primary energy storage device 42, the secondary energy storage devices 44, or in both the primary and secondary energy storage devices. The secondary energy storage devices 44 are selectively connected to the primary energy storage device 42 and the vehicle generator 46 through a circuit 50. One embodiment of the circuit 50 is illustrated in FIG. 2, and the operation of the circuit 50 is described in subsequent paragraphs.

During operation of the engine 12 (e.g., during an engine on condition), the primary energy storage device 42 may charge the secondary energy devices 44. Specifically, in one embodiment, the state of charge ("SOC") of the primary energy storage device 42 and the secondary energy storage devices 44 may be monitored to determine if the primary energy storage device 42 should charge the secondary energy devices 44. After starting the engine 12 (e.g., to the engine on condition), the SOC of the primary energy storage device 42 and the secondary energy storage device 44 are both monitored to determine if a threshold SOC is maintained. Specifically, the primary energy storage device 42 is monitored to determine if the SOC is above a primary threshold level (e.g., in one embodiment to 85% SOC). Alternatively, the charging current of the primary energy storage device 42 may drop to a threshold current (e.g., 2 Amps). If either condition is met, and if the SOC of the secondary energy storage devices 44 are below a secondary threshold level, then the primary energy storage device 42 may be connected to the secondary energy storage devices 44 through the circuit 50. Once either the primary energy storage device 42 drops below the primary threshold level, or the secondary energy storage devices 44 are above the secondary threshold level, then charging of secondary energy storage devices 44 through the circuit 50 ceases, and the vehicle electrical system voltage is maintained such that the primary energy storage device 42 may not be charged or discharged (e.g., once the primary energy storage device 42 reaches 85% SOC, the secondary energy storage devices 44 may not be charged by the primary energy storage device 42).

In one embodiment, an unfueled vehicle braking event may be used to charge the primary energy storage device 42 and the secondary energy devices 44 during the engine on condition. Specifically, in the event a brake pedal (not illustrated) is pressed by a driver, fueling to the engine 12 is temporarily ceased. During the unfueled vehicle braking event, the vehicle generator 46 converts mechanical power and energy into electrical power and energy beyond that required for vehicle electrical loads (e.g., the excess power or energy). Thus, the electrical system voltage is generally raised, and the excess power or energy is stored in the primary energy storage device 42 and in the secondary energy storage devices 44 through the circuit 50. Once the secondary energy storage devices 44 are above a threshold SOC level, the secondary energy storage devices 44 may no longer be charged through the circuit 50 during the unfueled vehicle braking event.

An electric heater 52 is included to selectively provide heat to the PF device 24. In the embodiment as shown, the electric heater 52 is positioned proximate to a front face 54 of the monolith filter 40 of the PF device 24. Specifically, the electric heater 52 is mounted adjacent to an upstream end 56 of the monolith filter 40. The electric heater 52 may include a resistive heating element (not shown) such as, for example, a resistive wire. When energized, electric current flows to the electric heater 52 through the resistive wire to generate heat. The electric heater 52 allows for the exhaust gas 15 and particulate matter to flow through to the PF device 24. In one exemplary embodiment, a zoned electric heater may be employed that heats individual sections to the monolith filter 40, however, it is to be understood that other types of electric heaters may be used as well.

The electric heater 52 is energized during regeneration of the PF device 24 to provide heat to the monolith filter 40. In one embodiment, the electrical heater 52 is energized during regeneration of the PF device 24 if the IC engine 12 is in an engine off condition. The electrical heater 52 is selectively connected to the secondary energy storage devices 44 by the circuit 50, where the secondary energy storage devices 44 provide electrical power to the electrical heater 52.

An air pump 60 is disposed upstream of the electric heater 52 and provides combustion airflow to the PF device 24 during regeneration since the engine 12 is in the off condition. The air pump 60 is selectively connected to and energized by the circuit 50, where the primary energy storage device 42 provides power to the air pump 60. A check valve (not illustrated) is included as well to generally prevent backflow through the air pump 60 when the air pump 60 is not in use (e.g., when the engine 12 is in the engine on condition and operating).

A control module 70 is operably connected to and monitors the engine 12, the injector 32, the circuit 50, and the exhaust gas treatment system 10 through a number of sensors. Specifically, FIG. 1 illustrates the control module 70 in communication with a temperature sensor 72 located in the exhaust gas conduit 14 as well as a backpressure sensor 76. The temperature sensor 72 is situated downstream of the PF device 24, and sends electrical signals to the control module 70 indicating the temperature in the exhaust gas conduit 14 in a specific location. That is, the temperature sensor 52 indicates the temperature of the PF device 24.

The backpressure sensor 76 is located upstream of the PF device 24 and generates a signal indicative of the carbon loading and particulate loading in the monolith filter 40. It should be noted that while FIG. 1 illustrates a backpressure sensor 76 for determining carbon loading in the monolith filter 40, other approaches may be used as well for determining carbon loading. For example, in an alternative embodiment, a delta pressure sensor may be used instead to measure the differential pressure across the PF device 24. The control module 70 includes control logic for continuously monitoring the backpressure sensor 76 and the temperature sensor 72. Specifically, the control module 70 includes control logic for monitoring the backpressure sensor 76 for the amount of particulates trapped within the monolith filter 40 of the PF device 24. The control module 70 further includes control logic for continuously monitoring the temperature sensor 72 for a temperature reading of the PF device 24.

In the embodiment as shown, the control module 70 is also in communication with an ignition switch 80. The ignition switch 80 sends a signal to the control module 70 that is indicative of the engine off condition. Specifically, the ignition switch 80 includes a key-on state and a key-off state, where the key-off state coincides with the engine off condition. In the key-on state, electrical power is supplied to the engine 12. In the key-off state, electrical power is not supplied to the engine 12. It should be noted that while the terms key-on and key-off are used, a key may not be employed with the ignition switch 80 in some embodiments. For example, in one embodiment the ignition switch 80 may be activated by proximity to a fob (not shown) that is carried by a user instead of a key. Thus, the key-on state exists when power is supplied to the engine 12 and the key-off state exists when power is not supplied to the engine 12, regardless of whether an actual key is employed. It should also be noted that while an ignition switch 80 is illustrated, other approaches may be used as well to determine the engine off condition.

The control module 70 includes control logic for selectively initiating regeneration of the PF device 24 during the engine off condition. Regeneration occurs if the amount of particulates trapped within the monolith filter 40 of the PF device 24 exceeds a threshold pressure value indicative of the need to regenerate, as well as if the temperature reading from the temperature sensor 72 exceeds a threshold temperature value indicative of the ability to regenerate.

FIG. 2 is an exemplary schematic diagram of the circuit 50 shown in FIG. 1. In the illustration as shown in FIG. 2, the electric heater 52 is shown as a resistor. In the example as shown, the secondary energy storage devices 44 are ultracapacitors (which are labeled C1 and C2), however, it is to be understood that batteries, or a mix of batteries and ultracapacitors may be used as well. The circuit 50 also includes a resistive element 90, voltage measurement devices 92 and 94, and switching elements 96, 98, 100, 102, and 104. In the embodiment as shown in FIG. 2, the resistive element 90 is an optional element and may be used as a current limiting resistor to limit inrush current to the ultracapacitor C1 when the switching element 98 is in a closed position.

In the exemplary embodiment as shown, the switching elements 96, 98, 100, 102 and 104 are illustrated as either single-pole single throw or single-pole double throw switches (switching element 100 is a single-pole double throw switch). In one embodiment, the switching elements 96, 98, 100, 102, and 104 are mechanical switches that are actuated by a mechanical element (e.g., a rotating cam, which is not illustrated in FIG. 2). In another approach, the switching elements may be relays. In yet another embodiment, the switch elements may be transistors. For example, in one embodiment, the switching elements may be a metal oxide semiconductor field effect transistors ("MOSFET") used for switching electronic signals. In the event MOSFETs are employed, some of the switching elements may require two MOSFET elements that are connected to one another in series, and that are oriented in opposing directions to generally block current from flowing in either direction. Although relays and transistor elements are discussed, it is to be understood that a variety of switching elements may be used as well.

A motor 110 is included in the circuit diagram as shown in FIG. 2, and represents a motor that is part of the air pump 60 (shown in FIG. 1). In one embodiment, the motor 110 is a DC motor with an on/off control. However, other types of motors such as, for example, a DC motor with variable speed control or a brushless DC motor may be used as well. The switching element 96 is provided to selectively apply electrical power to the motor 110. Specifically, in the event the engine 12 (shown in FIG. 1) is turned off, and if regeneration of the PF device 24 (shown in FIG. 1) is activated, the switching elements 96 and 98 are switched to an "ON" or closed position to provide electrical power to the motor 110.

The voltage measurement device 92 is provided for diagnostic and control purposes. Specifically, the voltage measurement device 92 measures the voltage available for operation of the motor 110 and for charging the secondary energy storage devices 44. By inference from the voltage measured by the voltage measurement device 92, it can be determined whether the switch 96 has closed and applied voltage to the motor 110. The voltage measurement device 94 is also provided for diagnostic and control purposes. Specifically, the voltage measurement device 94 measures the voltage across the parallel connection of each of the secondary energy storage devices 44, when the switch 100 is in the normally open ("NO") position, and the switch 102 is in the closed position, which allows inference of the SOC of the secondary energy storage devices 44. By inference from the voltage measured by the voltage measurement device 94, it can be determined whether the switch 98 has closed and applied voltage to the secondary energy storage devices 44. Additionally, when the switch 100 is in the normally closed ("NC") position and the switch 102 is in the open position, the voltage measured by the voltage measurement device 94 provides information for diagnostic and control purposes. This allows for inference of the SOC of the secondary energy storage devices 44, and the functionality of switches 100, 102 and 104. The voltage measurements from the voltage measurement devices 82 and 94 are sent to the control module 70. The control module 70 includes control logic for determining if the secondary energy storage devices 44 have a level of charge sufficient to support heating of an electrical heater 52 during regeneration.

The switching element 98 is provided to either apply or remove electrical power supplied from the primary energy storage device 42 to the secondary energy storage devices 44. Specifically, when the switching element 98 is in the open or OFF position, electrical power cannot be provided by the primary energy storage device 42 or the vehicle generator 46 to the secondary energy storage devices 44. When the switching element 98 is in the closed or "ON" position, the switch 100 is in the normally open position "NO" and switch 102 is in the closed or "ON" position, then electrical power is supplied from the primary energy storage device 42 and the vehicle generator 46 is provided to each of the secondary energy storage devices 44. Therefore, each of the secondary energy storage devices 44 are generally charged together at the same time.

The switching element 100 is provided such that when the switching element 100 is in a normally closed position (which is illustrated as "NC") the secondary energy storage devices 44 may be discharged (e.g., to provide power to the electric heater 52). The switching element 102 is provided such that when the switching element 102 is in the open position the secondary energy storage devices 44 may be discharged to provide power to the electric heater 52.

The switching element 104 is provided to allow for the secondary energy storage devices 44 to discharge and provide electric power to the electric heater 52. Specifically, the switching element 104 provides power to the electric heater 52 when the switching element 104 is in the closed position. When the switching element 104 is in the open position, electric power is not supplied to the electric heater 52.

Continuing to refer to FIG. 2, the block labeled (N-1), which is shown in phantom line, represents multiple secondary energy storage devices. For example, in the event N=6, this means that a total of six secondary energy storage devices are provided. Thus, the block labeled (N-1) is repeated five times to result in six secondary energy storage devices (e.g., C1, C2, C3, C4, C5 and C6).

In the event that the switching element 98 is in the open position, where the primary energy storage device 42 does not charge the secondary energy storage devices 44, the switching element 100 is switched to the normally closed ("NC") position, and the switching element 102 is in the open position. In this configuration, the secondary energy storage devices 44 (e.g., ultracapacitors C1 and C2) are connected to one another in a series configuration. When the energy storage devices 44 are connected to one another in the series configuration, the switching element 104 is in the closed position to provide electrical power from the secondary energy storage devices 44 to the electric heater 52.

In the event that the switching element 98 is in the closed position, where the primary energy storage device 42 charges the secondary energy storage devices 44, then the switching element 100 is switched to the normally open ("NO") position, and the switching element 102 is in the closed position. In this configuration, the secondary energy storage devices C1 and C2 are connected to one another in a parallel configuration. When the energy storage devices 44 are connected to one another in the parallel configuration, the switching element 104 is in the open position such that electrical power is not provided from the secondary energy storage devices 44 to the electric heater 52.

The circuit 50 as shown in FIG. 2 selectively switches between the series configuration and the parallel configuration to connect the secondary storage devices 44 with one another. Specifically, the secondary energy storage devices 44 are connected to one another in the series configuration to provide electrical power to the electric heater 52, and are connected to one another in the parallel configuration when charged by the primary energy storage device 42. Therefore, the secondary energy storage devices 44 are charged at a relatively lower voltage by the primary energy storage device 42, and are discharged to provide energy to the electric heater 52 at a relatively higher voltage. In other words, the secondary energy storage devices 44 are connected to one another in series when providing electrical power to the electric heater 52, where the series configuration allows for the secondary energy storage devices 44 to discharge at a higher voltage. Thus, the configuration as shown in FIG. 2 allows for the circuit 50 to have relatively small current ratings for the components such as switching elements (e.g., switching elements 96, 98, 100, and 102) and wiring, while at the same time providing sufficient power to the electric heater 52. Moreover, the primary energy storage device 42 (e.g., the vehicle battery) is disconnected while the electric heater 52 is energized in the engine off condition. This will lengthen the life of the primary energy storage device 42, as the primary energy storage device 42 is not drained by energizing the electric heater 52 in the engine off condition.

Turning back to FIG. 1, the exhaust gas treatment system 10 as described may also improve fuel economy of the engine 12. This is because the exhaust gas treatment system 10 regenerates the PF device 24 during the engine off condition, while using the air pump 60 to provide airflow to the PF device 24. Specifically, because the engine 12 is in the engine off condition during regeneration, the air pump 60 controls the amount of airflow to the PF device 24. Thus, because the airflow is controlled, a flame front created by the trapped particulate matter in the PF device 24 burning during regeneration cannot generally be extinguished by relatively high airflow created by accelerating the engine 12. As a result, the temperature of the exhaust gas 15 does not need to be elevated by the engine 12 using excessive fuel to regenerate the PF device 24. Moreover, because the electric heater 52 is used to provide heat to the PF device 24, the time to regenerate may be decreased when compared to regeneration using elevated exhaust gas temperatures.

Figure 3:
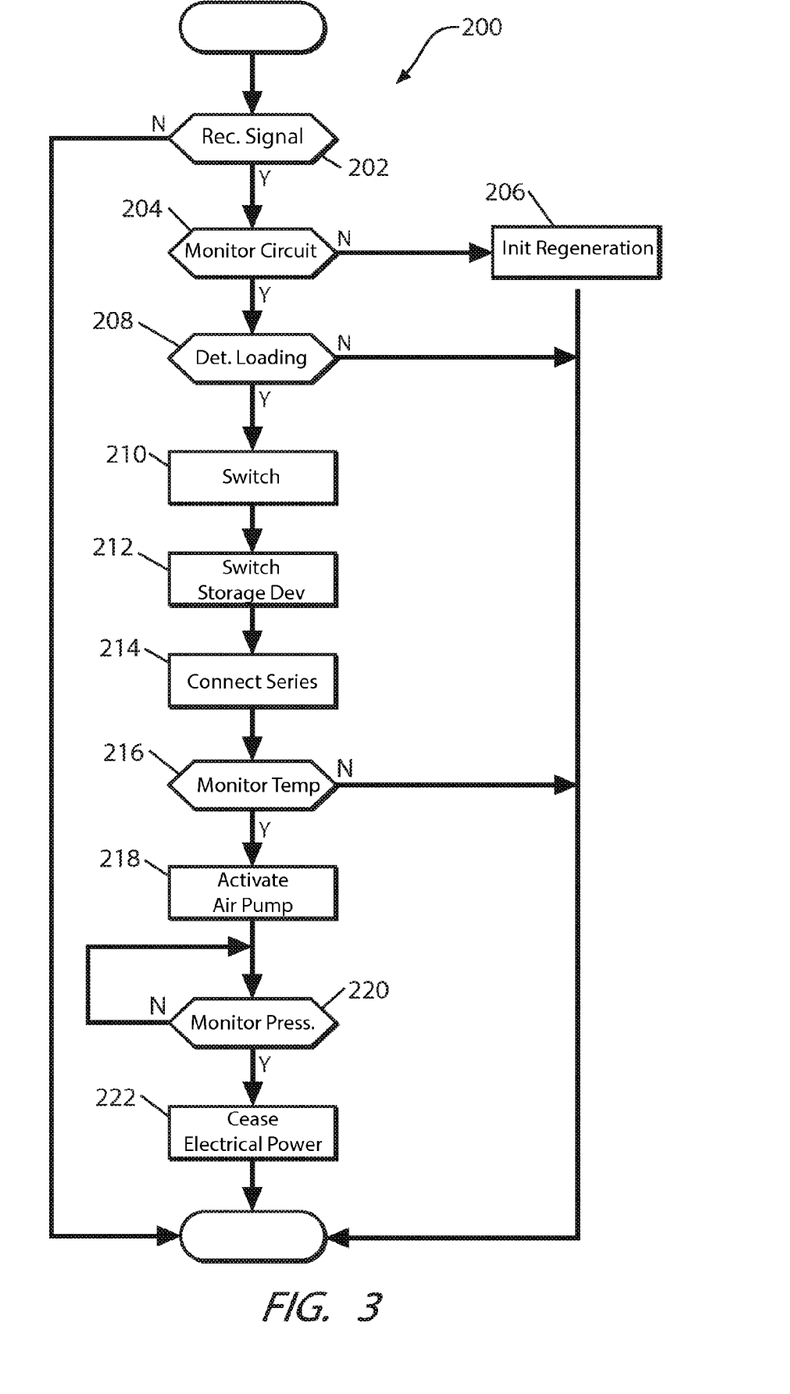
FIG. 3 is a process flow diagram illustrating a method of operating the exhaust gas treatment system shown in FIG. 1.

A method of regenerating the PF device 24 will now be explained. Referring to FIG. 3, an exemplary process flow diagram illustrating an exemplary process of operating the exhaust gas treatment system 10 is generally indicated by reference number 200. Referring generally to FIGS. 1-3, process 200 begins at step 202, where a control module 70 includes control logic for receiving a signal indicating an engine off condition. In one exemplary embodiment, an ignition switch 80 is in communication with the control module 70, and is used to indicate if the engine on or engine off condition has occurred, however it is to be understood that other approaches may be used as well. If the engine 12 is not in the engine off condition, process 200 may then terminate. Process 200 may proceed to step 204 in the event the engine 12 is in the engine off condition.

In step 204, the control module 70 includes control logic for monitoring a circuit 50 (shown in FIG. 1) to determine if the secondary energy storage devices 44 are at a SOC level that supports heating of an electrical heater 52 during regeneration. Specifically, with reference to FIG. 2, a voltage measurement device 94 is provided to measure the level of charge of each of the secondary energy storage devices 44. In the event that the secondary energy storage devices 44 are not at a SOC level that supports heating of the electrical heater during regeneration, then process 200 proceeds to step 206, where the control module 70 includes control logic for initiating regeneration during the next key-on state (if a backpressure sensor 76 generates a signal indicative of regeneration), where the key-on state coincides with the engine on condition. Process 200 may then terminate.

In the event that the secondary energy storage devices 44 are at the SOC level that supports heating of the electrical heater during regeneration, then process 200 proceeds to step 208. In step 208, the control module 70 includes control logic for determining the carbon loading and particulate loading in the monolith filter 40 (e.g., in one embodiment the control module 70 may monitor the backpressure sensor 76 during the engine on condition and stores the value in a memory of the control module 70). In the event that the level of carbon loading indicates that regeneration is not needed, process 200 may then terminate. In the event that the level of carbon loading indicates that regeneration of the PF device 24 is needed, process 200 may then proceed to step 210.

In step 210, the control module 70 includes control logic for switching a switching element 98 to an open position such that the primary energy storage device 42 (shown in FIGS. 1-2) is disconnected from the secondary energy storage devices 44 (shown in FIGS. 1-2). Specifically, referring to FIG. 2, the switching element 98 is opened to remove electrical power supplied from the primary energy storage device 42 to the secondary energy storage devices 44 (shown as C1 and C2 in FIG. 2). Process 200 may then proceed to step 212.

In step 212, the circuit 50 (shown in FIG. 2) switches the secondary energy storage devices from the parallel configuration to the series configuration. Specifically, a switching element 100 is switched to the normally closed ("NC") position, and a switching element 102 is in the open position. In this configuration, the secondary energy storage devices 44 are connected to one another in a series configuration. Process 200 may then proceed to step 214.

In step 214, the secondary energy storage devices 44 (e.g., C1 and C2 as shown in FIG. 2) are connected to the electrical heater 52. With reference to FIG. 2, a switching element 104 is switched to the closed position to allow for the secondary energy storage devices 44 to discharge, and energize the electric heater 52. Process 200 may then proceed to step 216.

In step 216, the control module 70 includes control logic for monitoring the temperature of the PF device 24 to determine if the filter 40 is at a temperature supporting regeneration. Referring to FIG. 1, the control module 70 monitors the temperature sensor 72 to determine the temperature of the PF device 24. In the event the temperature of the PF device 24 has not reached a level sufficient for regeneration, process 200 may continue to monitor the temperature of the PF device 24, or alternatively, process 200 may terminate. In the event the temperature of the PF device 24 has reached a level sufficient for regeneration, process 200 may then proceed to step 218.

In step 218, the control module 70 includes control logic for activating the air pump 60 (shown in FIG. 1) to provide airflow to the PF device 24 during regeneration. The air pump 60 is selectively connected to and energized by the circuit 50, where the secondary energy storage devices 44 provide power to the air pump 60. Specifically, referring to FIG. 2, the switching elements 96 and 98 are switched to the closed position to provide power to a motor 110. The motor 110 represents a motor that is part of the air pump 60 (shown in FIG. 1). Process 200 may then proceed to step 220.

In step 220, the control module 70 includes control logic for monitoring the backpressure sensor 76 for a signal indicating that regeneration of the PF device 24 is complete. In the event that the level of carbon loading indicates that regeneration is not complete, process 200 may return to step 220, where the control module 70 continues to monitor the backpressure sensor 76. In the event that the level of carbon loading indicates that regeneration of the PF device 24 is complete, process 200 may then proceed to step 222.

In step 222, the circuit 50 will cease to provide electrical power to the electrical heater 52 and the air pump 60 from the secondary energy storage devices 44. Specially, referring to FIG. 2, the switching element 96 is switched to the open position to cease providing power to the motor 110, and the switching element 104 is opened to cease providing power to the electric heater 52. Process 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, the internal combustion engine having an engine off condition, comprising:
an exhaust gas conduit in fluid communication with, and configured to receive an exhaust gas from the internal combustion engine;
a particulate filter ("PF") device in fluid communication with the exhaust gas conduit and having a filter structure for removal of particulates in the exhaust gas, the PF device selectively regenerated based on an amount of particulates trapped within the filter structure of the PF device during the engine off condition;
an electric heater disposed upstream of the filter structure and selectively energized to provide heat for regeneration of the PF device;
a primary energy storage device;
a plurality of secondary energy storage devices that are selectively connected to the primary energy storage device, the plurality of secondary energy storage devices selectively energizing the electric heater;
a plurality of switching elements that selectively connect in a series configuration and a parallel configuration the plurality of secondary energy storage devices; and
a control module in communication with the electric heater, the primary storage device, the plurality of secondary energy storage devices, and the internal combustion engine, the control module receiving a regeneration signal indicating the amount of particulates trapped within the filter structure of the PF device, the control module comprising:
a control logic for disconnecting the plurality of secondary energy storage devices from the primary storage device if the internal combustion engine is in the engine off condition; and
a control logic for connecting the plurality of secondary energy storage devices to the electric heater if the regeneration signal is received.

2. The exhaust gas treatment system of claim 1, wherein the control module includes control logic for switching the plurality of switching elements to the series configuration if the regeneration signal is received.

3. The exhaust gas treatment system of claim 1, wherein the control module includes control logic for switching the plurality of switching elements to the parallel configuration if the plurality of secondary energy storage devices are connected to the primary energy storage device.

4. The exhaust gas treatment system of claim 1, wherein the plurality of switching elements are at least one of a transistor element, a mechanical switch, and a relay.

5. The exhaust gas treatment system of claim 1, comprising an air pump that is in communication with the control module, the air pump is selectively activated to transfer heat from the electric heater to the filter structure.

6. The exhaust gas treatment system of claim 1, comprising at least one sensor in communication with the exhaust gas conduit to detect an operating condition of the PF device, the at least one sensor generating the regeneration signal indicative of the amount of particulates trapped within the filter structure of the PF device.

7. The exhaust gas treatment system of claim 1, wherein the primary energy storage device is a vehicle battery.

8. The exhaust gas treatment system of claim 1, wherein the secondary energy storage devices are at least one of a lithium-ion battery and an ultracapacitor.

9. An exhaust gas treatment system for an internal combustion engine, the internal combustion engine having an engine off condition, comprising:
an exhaust gas conduit in fluid communication with, and configured to receive an exhaust gas from the internal combustion engine;
a particulate filter ("PF") device in fluid communication with the exhaust gas conduit and having a filter structure for removal of particulates in the exhaust gas, the PF device selectively regenerated based on an amount of particulates trapped within the filter structure of the PF device during the engine off condition;
an electric heater disposed upstream of the filter structure and selectively energized to provide heat for regeneration of the PF device;
a primary energy storage device;
a plurality of secondary energy storage devices that are selectively connected to the primary energy storage device and are selectively connected to one another in one of a series configuration and a parallel configuration, the plurality of secondary energy storage devices selectively energizing the electric heater;
a plurality of switching elements that selectively connect in a series configuration and a parallel configuration the plurality of secondary energy storage devices; and
a control module in communication with the electric heater, the primary storage device, the plurality of secondary energy storage devices, and the internal combustion engine, the control module receiving a regeneration signal indicating the amount of particulates trapped within the filter structure of the PF device, the control module comprising:
a control logic for disconnecting the plurality of secondary energy storage devices from the primary storage device if the internal combustion engine is in the engine off condition; and
a control logic for connecting the plurality of secondary energy storage devices to the electric heater if the regeneration signal is received.

10. The exhaust gas treatment system of claim 9, wherein the control module includes control logic for switching the plurality of switching elements to the series configuration if the regeneration signal is received.

11. The exhaust gas treatment system of claim 9, wherein the control module includes control logic for switching the plurality of switching elements to the parallel configuration if the plurality of secondary energy storage devices are connected to the primary energy storage device.

12. The exhaust gas treatment system of claim 9, comprising an air pump that is in communication with the control module, the air pump is selectively activated to transfer heat from the electric heater to the filter structure.

13. The exhaust gas treatment system of claim 9, comprising at least one sensor in communication with the exhaust gas conduit to detect an operating condition of the PF device, the at least one sensor generating the regeneration signal indicative of the amount of particulates trapped within the filter structure of the PF device.

14. A method of operating an exhaust gas treatment system for an internal combustion engine, the internal combustion engine having an engine off condition, comprising:

providing a particulate filter ("PF") device in fluid communication with an exhaust gas conduit, the PF device having a filter structure for removal of particulates in an exhaust gas;

receiving a regeneration signal indicating the amount of particulates trapped within the filter structure of the PF device by a control module during the engine off condition;

disconnecting a plurality of secondary energy storage devices from a primary storage device if the internal combustion engine is in the engine off condition;

providing a plurality of switching elements that selectively connect in a series configuration and a parallel configuration the plurality of secondary energy storage devices;

connecting the plurality of secondary energy storage devices to an electric heater if the regeneration signal is received, the electric heater disposed upstream of the filter structure; and energizing the electric heater by the plurality of secondary energy storage devices to provide heat for regeneration of the PF device.

15. The method of claim 14, comprising switching the plurality of switching elements to the series configuration if the regeneration signal is received.

16. The method of claim 14, comprising switching the plurality of switching elements to the parallel configuration if the plurality of secondary energy storage devices are connected to the primary energy storage device.

17. The method of claim 14, comprising providing an air pump that is in communication with the control module, the air pump is selectively activated to transfer heat from the electric heater to the filter structure.

* * * * *